(12) United States Patent
Zellner

(10) Patent No.: US 7,949,764 B2
(45) Date of Patent: *May 24, 2011

(54) METHOD, SYSTEM, AND STORAGE MEDIUM FOR VALIDATING USERS OF COMMUNICATIONS SERVICES AND MESSAGES TRANSMITTED

(75) Inventor: Samuel Zellner, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 289 days.

This patent is subject to a terminal disclaimer.

(21) Appl. No.: 12/259,666

(22) Filed: Oct. 28, 2008

(65) Prior Publication Data

US 2009/0049530 A1    Feb. 19, 2009

Related U.S. Application Data

(63) Continuation of application No. 10/712,527, filed on Nov. 13, 2003, now Pat. No. 7,444,406.

(51) Int. Cl.
*G06F 15/16* (2006.01)

(52) U.S. Cl. ........ 709/227; 709/203; 709/217; 709/219; 709/222

(58) Field of Classification Search .................. 709/203, 709/217, 219, 222, 227
See application file for complete search history.

(56) References Cited

U.S. PATENT DOCUMENTS

| | | | |
|---|---|---|---|
| 7,234,064 B2 * | 6/2007 | Menschik et al. | 713/193 |
| 2002/0019817 A1 * | 2/2002 | Matsui et al. | 707/1 |
| 2002/0169836 A1 | 11/2002 | Hood et al. | |
| 2010/0198705 A1 * | 8/2010 | Spalink et al. | 709/224 |

* cited by examiner

*Primary Examiner* — Phuoc Nguyen
(74) *Attorney, Agent, or Firm* — Cantor Colburn LLP

(57) ABSTRACT

Exemplary embodiments of the invention relate to a method, system, and storage medium for validating users of communications services. The method includes generating records for communications service users by at least one service provider. The records store information relating to the communications service users including legal liability information, an originator type code, and a validation code assigned to selected originator type codes. The validation code facilitates validation of the communications service users. The method also includes storing the records in a subscriber classification database. The originator type code classifies the communications service users according to nature of use, communications type, business type, geography, and age.

3 Claims, 5 Drawing Sheets

METHOD, SYSTEM, AND STORAGE MEDIUM FOR VALIDATING USERS OF COMMUNICATIONS SERVICES AND MESSAGES TRANSMITTED

CROSS-REFERENCE TO RELATED APPLICATIONS

This application is a continuation of U.S. patent application Ser. No. 10/712,527 filed Nov. 13, 2003, the contents of which are incorporated by reference herein in their entirety.

BACKGROUND OF INVENTION

Embodiments of the present invention relate generally to electronic messaging tools and, more particularly, to a method, system, and storage medium for validating users of communications services.

In addition to the exchange of personal communications, email messaging, telephone communications, facsimile transmissions, instant messaging, etc. are increasingly becoming popular tools for marketing purposes as well. As a result, many messaging system users have been inundated with large quantities of unsolicited messages that are often unwelcome and/or of little or no value to the recipient. Further, a large amount of these communications can slow down a user's processor, consume a great deal of memory, carry viruses, and distract the user from the important messages that must be individually filtered. For the providers of communication services, there is a significant cost to carry large quantities of unsolicited traffic, and it does not make economic sense for them to incur this cost if their subscribers do not wish to receive these communications.

Preventing these unsolicited communications is difficult since the originators often disguise their intentions by frequently changing their identities and message. Accordingly, it would be desirable to be able to validate originators of messages and identify the messages intentions.

SUMMARY OF INVENTION

The foregoing discussed drawbacks and deficiencies of the prior art are overcome or alleviated by a method, system, and storage medium for validating users of communications services.

Exemplary embodiments of the invention relate to a method, system, and storage medium for validating users of communications services. The method includes generating records for communications service users by at least one service provider. The records store information relating to the communications service users including legal liability information, an originator type code, and a validation code assigned to selected originator type codes. The validation code facilitates validation of the communications service users. The method also includes storing the records in a subscriber classification database. The originator type code classifies the communications service users according to subject matter such as nature of use, communications type, geography, age, and business type. It will be understood that any additional classifications may be added to, or substituted for, the above classifications in order to realize the advantages of the invention. Other classifiers may include government, politics/voting, solicitations/information, charities/nonprofit, emergencies, etc.

Embodiments of the system include an originating communications device in communication with a first service provider and a recipient communications device in communication with a second service provider. The first and second service providers are in communication with one another via a communications network. The system also includes a certified communications system executing over the communications network. The certified communications system includes a subscriber classification database storing records of users of the communications services. The records store information relating to the communications service users such as legal liability information, an originator type code, and a validation code assigned to selected originator type codes. The validation code is used to facilitate validation of the communications service users. The originator type code classifies the communications device users according to nature of use, a communications type, business type, geography, and/or age. The certified communications system receives communications from originating communications service users via the first service provider and retrieves associated records. If the associated record contains a validation code, the certified communications system appends the originator type code to the communication and transmits the communication to the recipient communications service user via the second service provider along with the originator type code.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring to the exemplary drawings wherein like elements are numbered alike in the several FIGURES.

DETAILED DESCRIPTION

Disclosed herein is a method, system, and storage medium for validating users of communications services in order to enable service users to distinguish undesirable messages from relevant messages. Forms of communication that may be serviced by the certified communications system include email messaging, voicemail, facsimile transmissions, multimedia messaging, short message service (SMS), instant messaging, telephony, etc. The certified communications system is device independent in that it validates users of a variety of existing communications devices such as telephones, wireless devices (e.g., laptops, PDAs, cellular telephones), computers, facsimile machines, answering machines, etc. A validation database of communications service users are maintained by one or more communications service validators and examined whenever a communications transmission is initiated. If the service user has a subscription record in the database, a validation flag is associated with the message which is then forwarded on through the network. Validation codes and originator type codes are associated with the subscription records that provide information about the message sender. Subscribing recipients of the certified communications system may also provide validation criteria through their subscription records in order to specify the types of communications they authorize a service provider to forward to them or flag before forwarding to them. The certified communications system may be implemented on any type of existing communications network system such as point-to-point and point-to-multipoint communications networks as well as a public switched telephone network (PSTN), wireless, SMS, MMS, IP, WiFi, LAN, WAN, broadcast, video, radio, VoIP, etc.

Validation of a communications service user refers to the official or formal sanctioning of a communications service user to the extent that their communications activities are traceable and the service user accountable. Validation, as referred to herein, does not necessarily result in authentication in that the sender's name, as seen by a recipient, may not in all instances be the sender's actual name. However, validation signifies that there is a person or entity that is now accountable for their actions.

Figure 1:
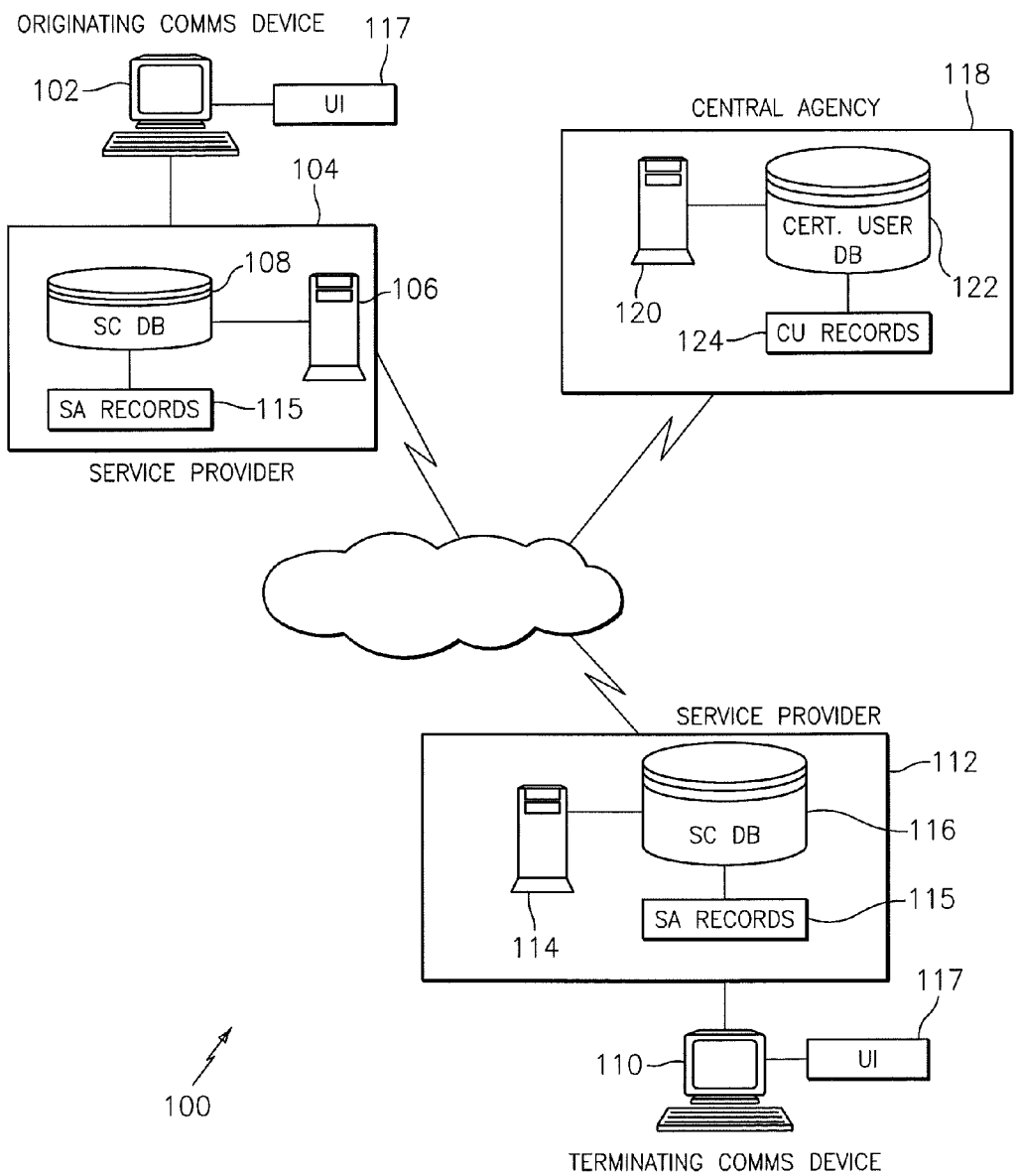
FIG. 1 is a block diagram of a system upon which the certified communications system is implemented in accordance with exemplary embodiments of the invention.

The certified communications system is described in FIG. 1 with respect to a specific type of communications device, namely computer systems. However, it will be understood by those skilled in the art that the certified communications system services are applicable to other types of communications devices as well. Thus, the description provided in FIG. 1 is for illustrative purposes, and should not be interpreted as limiting in scope.

Referring initially to FIG. 1, there is shown a block diagram of a network system for implementing the certified communications system in exemplary embodiments of the invention. Network system 100 includes a computer client system 102 in communication with a service provider 104 via a network connection.

Computer client systems 102 and 110 maybe general-purpose desktop computers that subscribe to an Internet service provider and may each include an email application, instant messaging system software, a web browser application, and/or any other suitable programs that reside in memory and execute on computer client systems 102, 110. It will be understood by those skilled in the art that the certified communications system of the invention may be executed on systems with variant architectures. Computer client systems 102, 110 are in communication with other entities of network system 100 via a network connection such as the Internet or other suitable means of networking architecture. Computer client system 102 as the sender of a message is also referred to herein as "originating communications device", and computer client system 110 as a recipient of the message is referred to herein as "terminating communications device."

Computer client systems 102 and 110 each subscribe to a communications plan via service providers 104 and 112, respectively. In the embodiment depicted in FIG. 1, service providers 104 and 112 are Internet service providers (ISPs) and provide Internet services to computer clients 102 and 110 under a subscription plan. Generally, service providers receive message transmissions from computer clients and forward them onto other service providers in accordance with the messaging instructions contained in the message address. The other service providers then forward the messages onto the appropriate computer client systems.

Service providers 104 and 112 each comprise a server 106 and 114, respectively, for receiving and transmitting communications between subscribing computer client systems 102 and 110. Servers 106 and 114, may each comprise a high-powered multiprocessor computer device including web server and applications server software for receiving requests from computer client systems 102 and 110 to access email or other messaging services via the Internet or other network. While only two servers 106 and 114 are shown, it will be understood that any number of servers may be used by service providers 104 and 112 in order to realize the advantages of the invention. In the system of FIG. 1, service providers 104 and 112 are also referred to herein as communication service validators in that they perform the validation services of the certified communications system as described herein, in addition to providing traditional communication services (e.g., Internet service, telephone service, etc.). It will be understood that third party entities may provide the validation services of the certified communications system under an agreement with the service providers.

Figure 4:
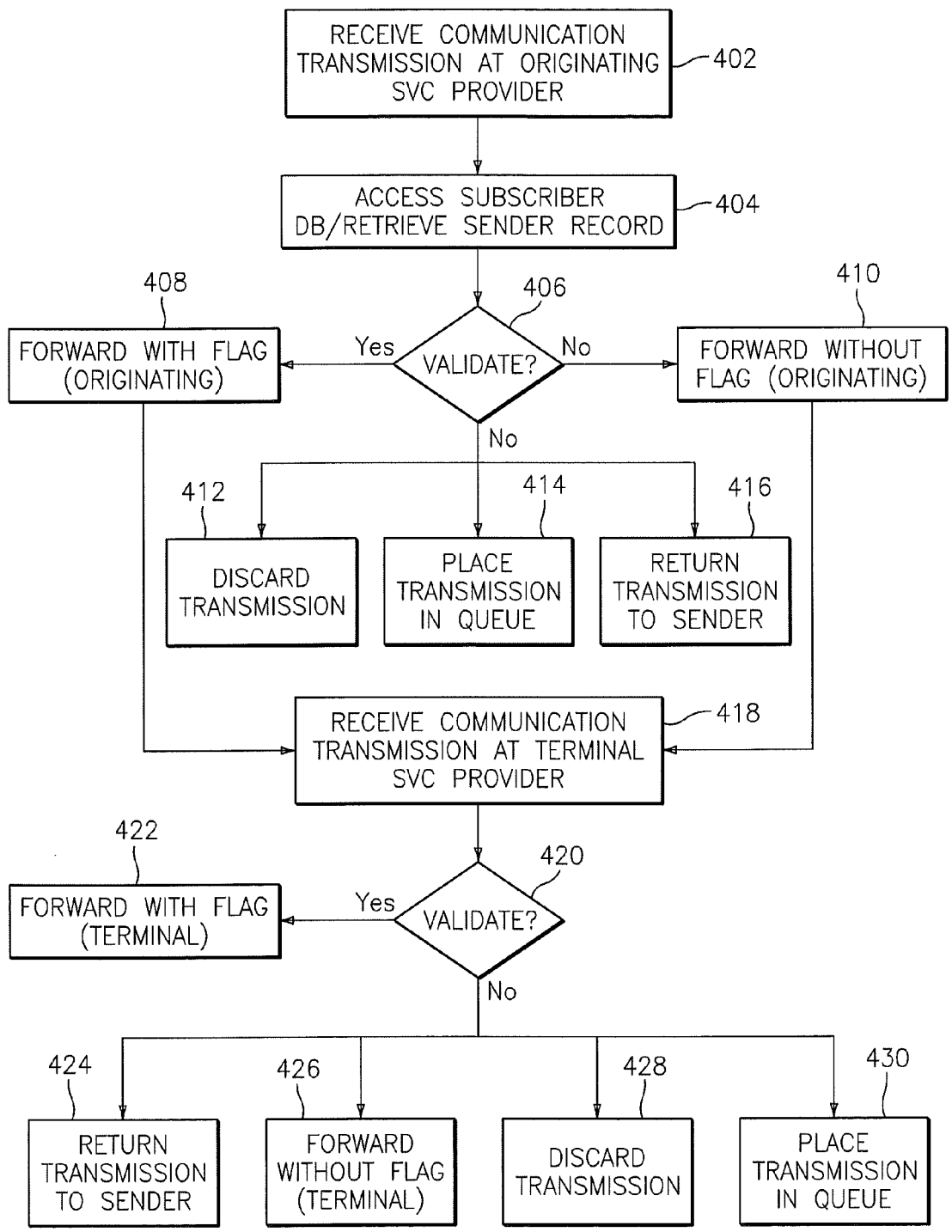
FIG. 4 is a flowchart describing a process of implementing the certified communications system in accordance with embodiments of the invention.

Service providers 104 and 112 further comprise subscription classification databases 108 and 116, respectively, for storing subscriber account records 115 as described further herein (see generally FIG. 4). Subscriber account records 115 include subscriber information, originator type codes, validation codes, and profiles that include business rules adopted by the subscriber. Participating service providers classify their subscribers into categories based on use, communications type, geography, age, etc. Some of these categories may be defined by a centralized body (e.g., standards or industry association). These categories may include consumer, business, telemarketing, and undefined. A consumer classification refers to a subscriber who sends personal communications. A business classification refers to subscribers associated with a business or whose primary use is business related. A telemarketing classification refers to subscribers who plan to use this mode of communications for solicitations. An undefined classification is reserved for subscribers who would prefer not to identify themselves or their intentions. For example, a subscriber may wish to associate with a personal or professional online chat room without revealing his/her identity. Subscribers with undefined classifications will not receive validation and no validation code is associated with the subscriber. By providing this option, a subscriber may selectively toggle between classifications as needed. For example, a subscriber in a consumer classification may wish to be validated with certain recipients and forego validation with other recipients depending upon the subscriber's circumstances. Likewise, a subscriber may toggle between validation and validation suppression with respect to a single recipient. In a telephone environment, for example, a subscriber may set his/her telephone to accept all consumer calls, limit business calls between 9:00 a.m. and 5:00 p.m., and block all telemarketing calls or undefined callers. In the event a friend is calling a subscriber from his/her workplace, the certified communications system provides an option to allow the subscriber to override the classification of received communications via business rules specified in the subscriber's profile. This may also include a caller announcement function whereby the identity of the sender is announced to the subscriber. Exceptions to the business rules may be enabled by a subscriber through the use of an exception report that indicates any exceptions to the prohibited messages defined in the business rules. By having subscribers declare their intentions, receivers of communications may easily screen their messages.

Also included in FIG. 1 is a central agency entity 118 including a server 120 and certified user database 122. Central agency entity 118 regulates the service providers 104 and 112 to ensure the integrity of the authorized communications system services. Service providers 104, 112 register with central agency entity 118 in order to become certified participants in the system. Once registered, service provider records 124 indicating their status are stored in certified user database 122. Registration activities for service providers and other users are further described in FIG. 2.

In one embodiment, central agency 118 executes the certified communications system and allows subscribing clients such as computer client systems 102, 110, as well as service providers 104 and 112 to access its features and functions as described further herein. In alternate embodiments, service providers themselves execute the certified communications system. In yet a further embodiment, client systems 102 and 110 share execution of the certified communications system with either of service provider systems 104, 112 or central agency entity 118 and may store the certified communications software internally. In alternate embodiments, service providers 104 and 112 are Internet service providers that provide email messaging services and maintain a client base of email users. It will be understood that other embodiments, in addition to those specified above, are contemplated by the certified communications system and that the above representations are made for illustrative purposes and should not be construed as limiting in scope.

The certified communications system further comprises a graphical user interface 117 for enabling users of computer client systems 102 and 110 define criteria for determining relevant or desirable messages as desired. Sample computer screen 400 of FIG. 4 illustrates the features of the certified communications system graphical user interface 117.

As indicated above, the certified communications system may be executed as a standalone application that is installed or downloaded on a computer client system or may be incorporated into an existing messaging application or similar commercially-available product as an enhancement feature. Further, as indicated above, the features of the certified communications system may be provided via a third party application service provider (ASP) or e-utilities broker where service is provided for a per-use fee in alternative embodiments.

Figure 2:
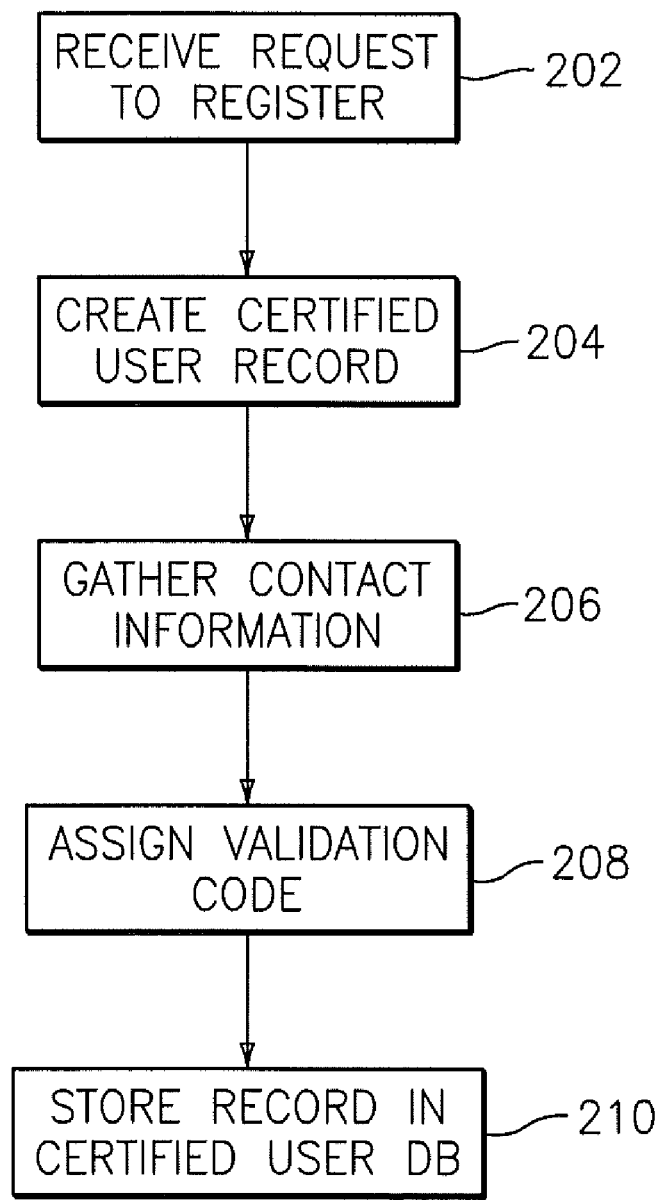
FIG. 2 is a flowchart describing a process of registering general users (end users) for the certified communications system services in accordance with embodiments of the invention.

FIG. 2 is a flowchart describing the process of registering service providers with a central agency 118 to become validators for the certified communications system. The certified communications system receives a request to register from a service provider at step 202. A service provider record 124 is created by the certified communications system at step 204. At step 206, contact information is collected for the registrant such as provider name, address, contact, and other similar types of information. The certified communications system assigns a validation code to the record 124 at step 208. This may be accomplished by assigning the validation code to the routing address of the communications service user. At step 210, the completed service provider record 124 is stored in certified user database 122 and the service provider becomes a certified participant in the system.

Figure 5:
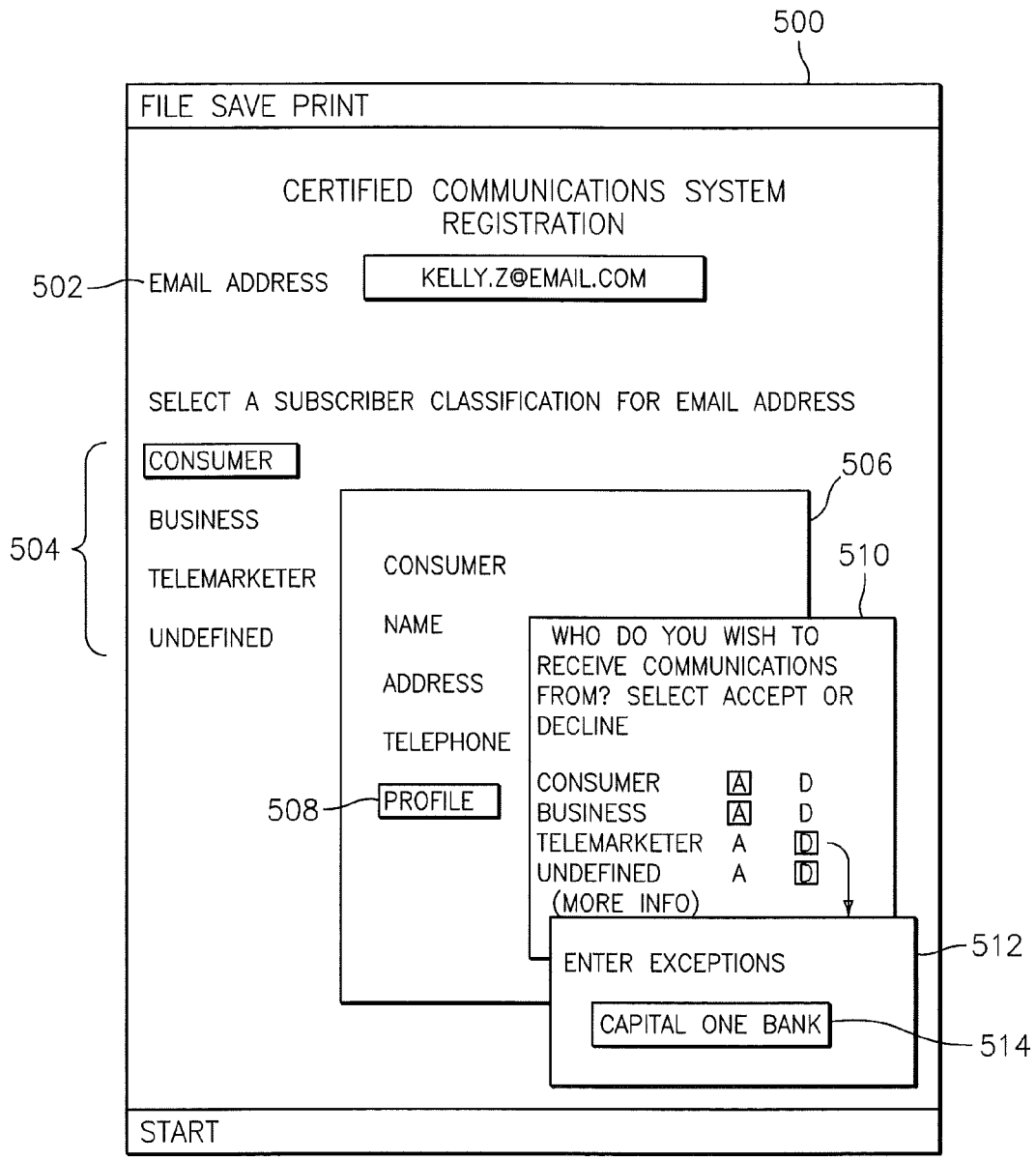
FIG. 5 illustrates a sample computer screen window as seen by a general user registrant of the certified communications system, in accordance with embodiments of the invention.

Registration for general users will now be described in FIG. 3. A request to register is received from a general user (e.g., a user of computer client systems 102, 110) at step 302. A subscriber account record 115 is created at step 304. A sample computer screen window 500 of FIG. 5 illustrates a registration web page of user interface 117 as seen by a general user. Contact information 502, 506 is gathered by the certified communications system at step 306. The certified communications system assigns an originator type code 504 in accordance with the information provided by the registrant at step 308. A validation code is assigned at step 310. A validation code may comprise any indicia desired that facilitates the certification of the subscriber. For example, the subscriber's email address 502 may be used as a validation code. In this manner, validation may be processed by sending an email with a unique transaction number to the subscriber requesting that he/she open the email and activate the subscription by clicking on a URL and entering the transaction number. Thus, the user's email account is confirmed to be a valid and accurate source of contact information for the subscriber. The certified communications system contemplates various other ways to validate a subscriber in addition to the above example. For example, a subscriber who accesses the services of the certified communication system under a fee agreement may be required to provide financial account information such as personal bank account or credit card information. This account information could be used for validation as well. A validation code may be presented in any form that is capable of distinguishing a validated message from a non-validated message. For example, a validation code may comprise a symbol, a letter, a word, a picture, or a sound.

Business rules as shown in subwindows 510 and 512 may also be specified by the registrant at step 312. At step 314, the subscriber account record 115 is stored in applicable subscriber classification database 108, 116.

Figure 3:
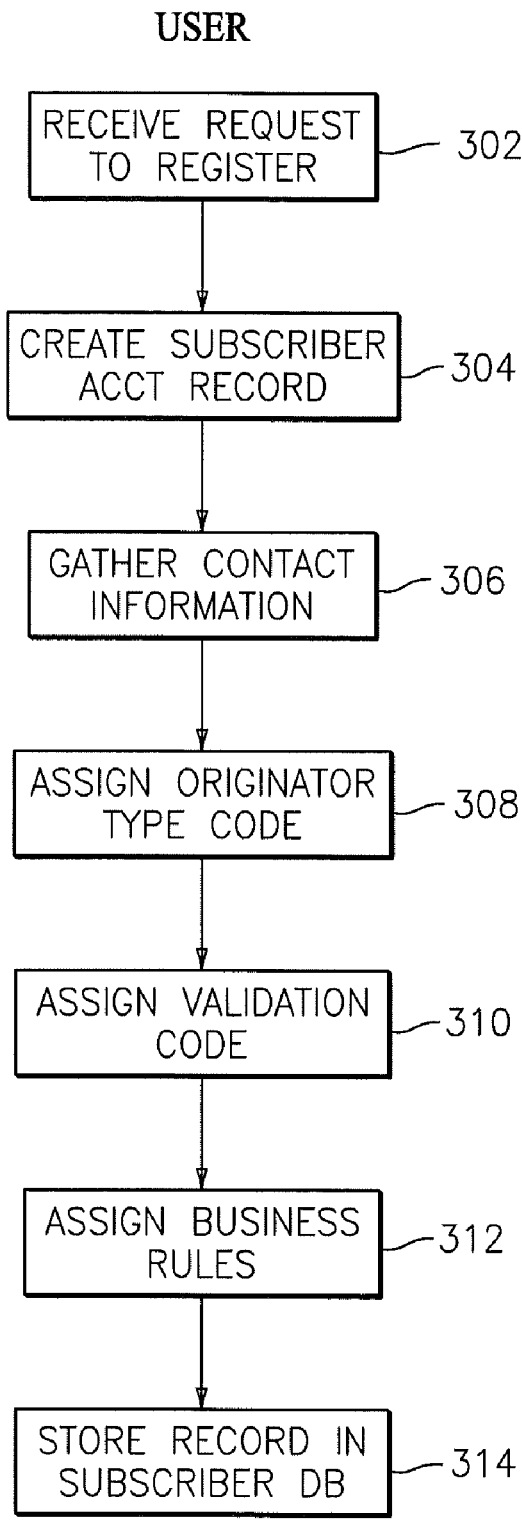
FIG. 3 is a flowchart describing a process of registering service providers with a central agency for the purpose of becoming 'validators' for the certified communications system in accordance with embodiments of the invention.

Once a general user registrant has provided the information above in FIG. 3, the user may begin to use the certified communications system services as described in FIG. 4. At step 402, a communication transmission (message) is received by a service provider 104 from an originating user at computer client system 102. The certified communications system accesses subscriber classification database 108 and retrieves the subscriber account record 115 associated with the sender of the transmission at step 404. At step 406, it is determined whether the message is valid by checking the originator type code associated with the sender and the subject line of the message. If valid, the certified communications system flags the message and forwards it on to the recipient at step 408. The originating service provider 104 appends the originator type code and validation code to the subject line of the email. The validation code includes an encrypted key that the receiving service provider 112 must decrypt in order to validate the authenticity of the originating service provider 104 and originator type code. This appendage, or flag, may comprise various types of indicia for identifying and distinguishing the validated messages from those that are not validated. If not valid, one of several possible actions may be taken. The message may be discarded entirely at step 412, placed in a queue of invalid messages 414, forwarded to the recipient without a flag at step 410, or returned to the sender at step 416. If options at steps 412 or 416 are selected, the process ends as the recipient never receives the communication.

The receiving (also referred to as terminal) service provider 112 (if different from the originating service provider) receives the transmission from any of steps 408, 410, or 414 at step 418. Similar to step 406, the message is examined for validity at step 420. The certified communications system checks the profile information (see FIG. 5, 510-514) and acts in accordance with the recipient subscriber's profile. One of several actions may be performed based upon the results of step 420. If the message is valid, the message is forwarded with a flag to the recipient at computer client system 110 at step 422. If the message is not valid, it may be returned to the sender at step 424 or forwarded to the recipient without a flag at step 426, thus, distinguishing the message from those identified as valid. Alternatively, the message may be discarded at step 428, or placed in a message queue at step 430. Once the message is forwarded, a recipient is able to acquire information about the message and the message sender without engaging in a full communication engagement or establishing a communications session with the originator. For example, the recipient receives a telephone transmission that indicates via the originator type code that the caller is a telemarketer. The recipient has learned of this information without answering the telephone call. Likewise, a recipient of an email, instant message, or other communication may acquire this information before engaging in a communications session with the calling party as well.

As will be appreciated from the above description, the restrictions and limitations that exist with messaging systems are efficiently overcome. Validation codes and originator type codes are associated with subscription records of communications service users which provide information about the users. Users provide validation criteria through their subscription records in order to specify the types of messages they authorize a service provider to forward to them or flag before forwarding to them. This allows the users to effectively screen communications before opening them.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A communications device for validating a sender of a communication, said communications device in communication with a service provider via a network, said communications device comprising:
   a communication initiated by an originating communications device;
   a means for assigning a purpose to said communication; and
   a means for conveying a validation status associated with said communication, said validation status comprising at least one of:
   valid; and
   invalid;
   wherein said validation status is operable for assigning accountability to a
   sender of said communication;
   a link to a service validator; and
   a link to a record storing information relating to said sender of said communication, said record including:
   legal liability information;
   an originator type code associated with said user operable for identifying said purpose of a communication, said originator type code: and
   a validation code assigned to selected originator type codes, said validation code operable for facilitating said validation status of said sender;
   wherein upon initiation of said communication by said originating communications device, said service validator performs:
   retrieving said record; and
   if said record contains said validation code, appending said originator type code to said communication; and
   alerting said recipient communications device of said communication.

2. The communications device of claim 1, further comprising:
   a means for conveying said purpose and said validation status to a recipient communications device before establishing a communications session between said originating communications device and said recipient communications device.

3. The communications device of claim 1, wherein said validation code includes one or more of:
   a symbol;
   a letter;
   a word;
   a picture; and
   a sound.

* * * * *